Patented Apr. 30, 1935

1,999,873

UNITED STATES PATENT OFFICE 1,999,873

PROCESS OF PREPARING ZINC CHLORIDE MELTS FOR GRANULATION

Frank L. Frost, Jr., Cleveland Heights, Ohio, assignor to The Grasselli Chemical Company, Cleveland, Ohio, a corporation of Delaware No Drawing. Application June 9, 1932, Serial No. 616,370

3 Claims. (Cl. 83—91)

Approximately anhydrous zinc chloride is commonly produced by evaporation of zinc chloride solutions in direct fired pans and pushing the heating until most of the water is evaporated and the zinc chloride is molten. Due to the hygroscopic nature of the product, the melts are directly poured into the final shipping receivers where the zinc chloride solidifies to a coherent mass.

The melting point of zinc chloride depends greatly upon the degree of hydration. While melting points up to 360° C. can be found in the literature, these figures are generally discounted and various standard works indicate about 280° C. as the true melting point of substantially anhydrous zinc chloride. It would appear from my own experience that about 260° C. is the melting point of a 95–96% $ZnCl_2$.

Zinc chloride has also been made in granular form by agitating its melts while they solidify. Such operations are accompanied with considerable difficulties, as the particle size of the solidified granules could not be controlled and the mixture of granules, ranging from powder size to granules which would not pass a 30 mesh screen, as ordinarily obtained, is very apt to cake and the advantage of a granular product over the one solidified in block is lost by such caking.

I have found that a granular product of reasonably uniform size can be obtained by controlling the melting temperature of the zinc chloride and controlling the condition during cooling until crystallization of zinc chloride has started.

My invention comprises preparing a zinc chloride melt, controlling its temperature during a preliminary cooling step during which the melt is kept as an undisrupted body until crystallization has set in and the melt has changed into a mush of crystals in molten zinc chloride, and then granulating said mush.

One important feature of my novel process is control of the temperature during which cooling sets in. I first evaporate a zinc chloride solution until the desired degree of dehydration is obtained. I then maintain the liquid zinc chloride under gentle agitation until solidification has set in and control the temperature during this step so that it drops only 20° C., more or less, during this preliminary cooling step. With high degrees of dehydration, that is to say a high melting point, the temperature drop until crystallization sets in could be less than 20°, at lower temperatures the temperature drop can be greater. When a mush of solid zinc chloride in liquid is obtained, I submit this mush to granulation by continued cooling under disruptive agitation.

In operating in this manner, the formation of powdery and oversize material is practically avoided and by controlling the operation of the granulating equipment the average size of the granules can be varied at any desired point within reasonable limits.

The preparation of the zinc chloride melt follows usual practice, namely evaporation of zinc chloride liquor of desired purity in a direct fired cascade apparatus. In following the practice of my invention, the molten zinc chloride is run from the cascade apparatus into a preferably enameled kettle in which it is brought to a temperature of for instance not less than 250° C., depending on the degree of hydration desired. This kettle is equipped with a slow moving stirrer. The molten zinc chloride is kept agitated in this kettle until a mush of crystals in a thick liquid of zinc chloride is formed, the temperature in the meantime being kept within a range of about 20° C. for instance between 250 and 230° C. The agitation during this cooling must be gentle so that the pasty mass is not disrupted but remains as a continuous body. When a crystal mush has been formed, it is conveyed to the granulator where the cooling is continued while the mass is broken up by agitation.

An apparatus, which was found quite convenient for granulating such a mush of partly solidified zinc chloride, consists for instance of a stone ware tube of for instance 8 to 12 inches in diameter and 10 to 15 feet long equipped with a rotating central shaft which carries pins dipping into the mass of zinc chloride. The mush of zinc chloride is fed in at one end, it gradually moves forward to the opposite end of the tube, it cools down during this passage and is broken up into small granules which are discharged solid at the far end. In this manner a product substantially free from powder is obtained.

Instead of the above granulating tube, other equipment can be used in which the mush of zinc chloride is submitted to disruptive agitation during cooling. Granulating tables, as used for instance for solidification of nitrates and other inorganic salts, are useful for the present purposes if adapted to the particular problem presented by granulating zinc chloride.

I claim:

1. In a process for granulating zinc chloride, the steps of preparing a body of molten zinc chloride, cooling said body and submitting it to gentle agitation during cooling without disruption of the pasty mass until a mush of solid zinc chloride in a pasty, liquid zinc chloride is formed, and continuing cooling with disruptive agitation.

2. In a process for granulating zinc chloride, the steps of preparing a body of molten zinc chloride, cooling said body to a temperature of above about 230° C. and subjecting it to gentle agitation during such cooling without disruption of the pasty mass until a mush of solid zinc chloride in a liquid, pasty zinc chloride is formed, and continuing cooling with disruptive agitation.

3. In a process for granulating zinc chloride, the steps of preparing a body of molten zinc chloride, cooling said body to a temperature of about 230° C.–250° C. and subjecting it to gentle agitation during such cooling without disruption of the pasty mass until a mush of solid zinc chloride in a pasty, liquid zinc chloride is formed, and then cooling said pasty mass with disruptive agitation.

FRANK L. FROST, Jr.